United States Patent [19]

Sunasky

[11] 4,165,944

[45] Aug. 28, 1979

[54] CONNECTION MEANS FOR STRUCTURES

[75] Inventor: Joseph Sunasky, Luton, England

[73] Assignee: Dexion-Comino International Limited, Bedfordshire, England

[21] Appl. No.: 926,170

[22] Filed: Jul. 19, 1978

[30] Foreign Application Priority Data

Jul. 28, 1977 [GB] United Kingdom ............... 31799/77

[51] Int. Cl.$^2$ ............................................. A47F 5/10
[52] U.S. Cl. .................................. 403/254; 211/192; 403/317; 403/353
[58] Field of Search ................ 211/192, 191; 403/353, 403/252, 253, 254, 316, 317, 319, 237; 248/222.1, 221.3, 220.2, 73, 243

[56] References Cited

U.S. PATENT DOCUMENTS

| 2,261,956 | 11/1941 | Brownlie et al. | 248/243 |
| 3,456,970 | 7/1969 | Sunasky | 403/319 |
| 3,637,087 | 1/1972 | Denny | 211/192 |
| 3,862,691 | 1/1975 | Mori | 211/191 |
| 3,881,829 | 5/1975 | James | 211/192 X |

*Primary Examiner*—Andrew V. Kundrat
*Attorney, Agent, or Firm*—Pollock, Vande Sande and Priddy

[57] ABSTRACT

In connection means comprising a hook projecting from one structure member and shaped for engagement with an elongated hole having a portion of downwardly tapered shape in another structure member, the hook is complemented by a boss which projects from the same face of the said one member, but spaced from the hook in the vertical direction, and which engages in a said hole in the other member. In a preferred embodiment, the boss is of a shape, for example a truncated pyramid with a trapezium base, engageable by its sides with the sides of the same hole with which the hook is engaged. The hook and boss are integral with the said one member, the boss being disposed closely above the hook from which it is separated by a transverse web. The sides of the boss are undercut. A spring-loaded locking device may be provided in conjunction with the boss.

6 Claims, 7 Drawing Figures

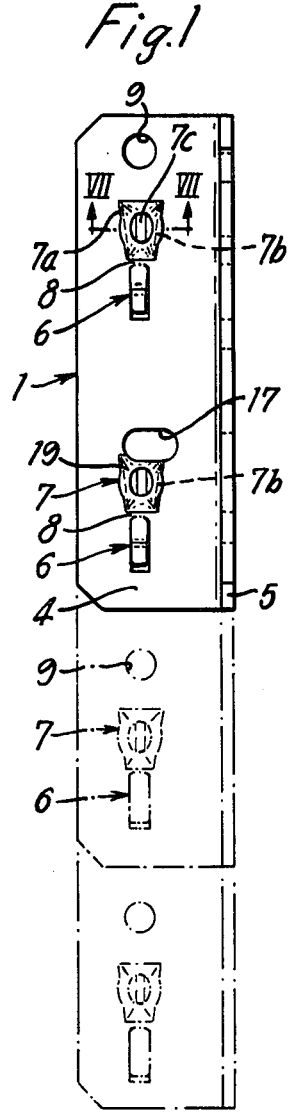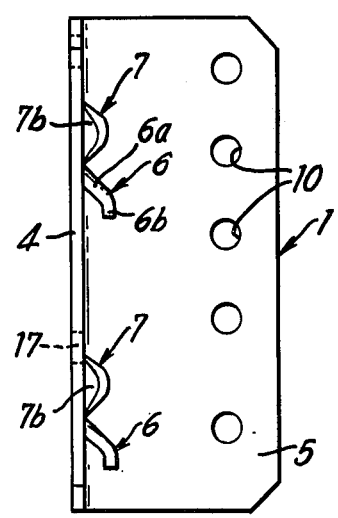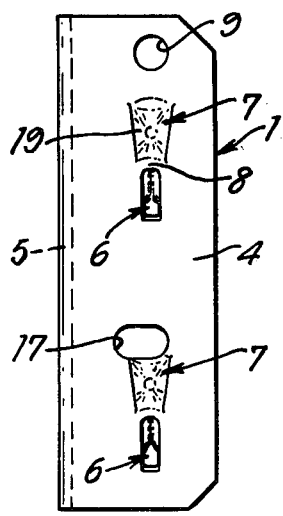

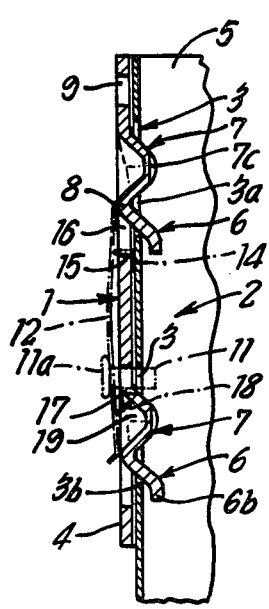
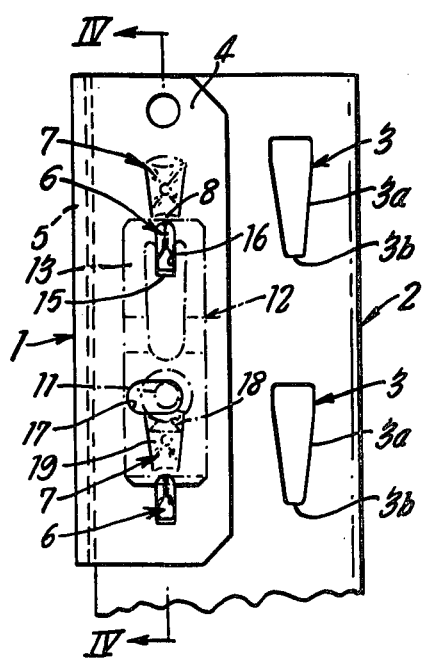
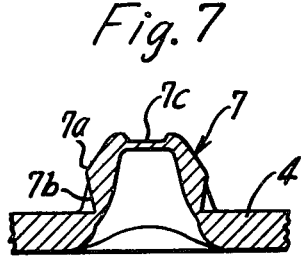
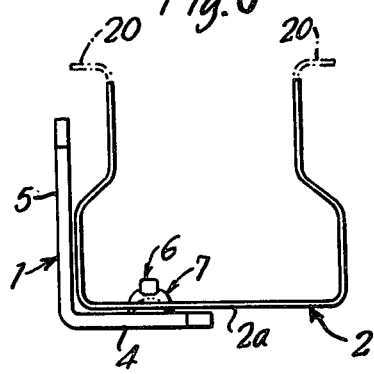

CONNECTION MEANS FOR STRUCTURES

This invention concerns improvements relating to connection means for structures, particularly means for releasably connecting upright and beam members of pallet or other racking, shelving or like framework structures.

A variety of proposals have been made for such connection means, but have proved not wholly satisfactory with respect, in particular, to high rigidity and strength of connection in conjunction with economic use of material in the connection means and in the connected members, as well as ease and versatility of use. The invention seeks to avoid the deficiencies of prior proposals and to provide connection means which satisfy the practical requirements of, in particular, structures such as have been referred to above.

According to the invention, in such connection means including at least one hook or stud, hereinafter referred to as a hook, provided on one member, for example a beam, and engageable or each engageable in an elongated hole in the other member, for example an upright, the hole or each hole is of downwardly tapered shape and the or each hook, shaped for engagement with the hole, is complemented by a boss projecting from the same face of the said one member as the hook, but spaced from the latter in the vertical direction. In this specification and the appended claims, reference to up, down and vertical refer to the directions in relation to the position of use of the connection means.

Preferably, the boss is of complementary downwardly tapering shape for engaging by its sides with parts of the sides of the downwardly tapering shape of the same hole with which the hook is engaged.

With such connection means, a large bearing area can be achieved between the hook and boss on the one member and the sides of the tapered hole in the other member, so that high rigidity and strength can be obtained. At the same time, the boss and hook can be shaped to afford a good lead into the tapered hole, so that exact preliminary positioning of the connection means in relation to the hole is not necessary for attaining engagement on assembly. A connection component can be very economically manufactured, including a vertical series of such hook/boss combinations, from a single piece of metal by cold-forming in a press using automatic techniques.

One manner of carrying the invention into effect will now be more fully described by way of example with reference to the accompanying drawings, in which:

FIG. 1 is an inside elevational view showing, in full lines, a connector having two hook/boss combinations and, in chain lines, the outlines of longer connectors with three and four such combinations respectively, FIG. 2 is an inside elevational view at right angles to that of FIG. 1, FIG. 3 is an outside elevational view corresponding to that of FIG. 1, FIG. 4 is a vertical section in which the connector is shown, in the same position as in FIG. 2, mounted on part of an upright, FIG. 5 is an elevational view of the connector shown, in the same position as in FIG. 3, mounted on the upright, FIG. 6 is an outline plan view showing the connector mounted upon an upright, and FIG. 7 is a section on the line VII—VII in FIG. 1.

For this example, it will be assumed that the connection is to be between a beam (not shown) having an end connector 1 and an upright 2 (FIGS. 4 to 6) of a pallet-rack framework, which connector is provided with vertical series of coffin-shaped holes or slots 3 (FIG. 5). The connector is an angle-section member with flanges 4 and 5 (FIG. 6), the flange 4 being provided with combinations of hook 6 and boss 7, as hereinafter described. Beams of various cross-sections and sizes may have such connectors attached to their ends, preferably by welding. By such connection means complete structures can be readily assembled to meet requirements.

As seen in elevation from the inside of the connector flange 4 (FIG. 1), each hook 6 has a generally parallel-sided outline with slightly rounded lower corners, the width being such as to ensure snug lodgement in the tapered lower part 3a of a hole 3 (FIGS. 4 and 5) in the upright 2. As seen from the inside of the flange 5 (FIGS. 2 and 4), the external outline of the hook 6 consists of a portion 6a, inclined downwardly away from the flange 4, followed by a shorter vertical tip portion 6b. The inside of the hook similarly comprises a first inclined surface followed by a vertical tip surface. The shape is thus such as to ensure a good lead-in of the hook 6 into a hole 3.

Again as seen from the inside of the connector (FIGS. 1 and 2), each boss 7 is located closely above a hook 6, to which it is connected by a narrow transverse bridge or web 8. It rises in truncated pyramidal or conical form from a base of an approximately trapezium shape, whose side edges 7a are inclined downwardly and inwardly with an inclination corresponding to that of the two sides of the lower tapered part 3a of the hole 3 and of a mean width such that the boss 7 will engage firmly against the said sides of the hole when the tip 6b of the hook 6 has engaged inside the lower edge 3b of the hole. The crest of the boss 7 is truncated with an oval outline (FIG. 1) and has a vertical recess 7c. Parts of the side walls of the boss near its base are undercut externally, with a slight inward inclination towards the base, suitably at 10°, as indicated at 7b in FIG. 7. The undercutting of the downwardly tapered boss 7, across the planes of the connector 1 and upright 2, assists in holding the hook 6 into the hole and the connector 1 to the upright 2. This gives good positive engagement and resistance to forces which might be produced in a horizontal direction on the beam and tend to cause disconnection. Except near the base, the boss may be rounded externally (FIGS. 1 and 2), whereby engagement in the hole 3 and disengagement when, say, a beam is to be repositioned is facilitated. The elevation of the boss 7 from the face of the flange 4 (FIG. 2) is slightly less than the extreme elevation of the hook 6.

The connector may be provided with holes or slots for additional purposes, for instance round holes 9 (FIG. 1) above a hook/boss combination, including one such hole near the top of the flange 4 and a vertical series of equally spaced round holes 10 (FIG. 2) near the free edge of the other flange 5 (FIG. 2).

FIG. 1 shows in full lines a connector 1 with two hook/boss combinations 6, 7. A connector may be provided with three or more such combinations, if required. The outline of the lower parts of longer connectors with three and four hook-boss combinations, each identical with the combination described above, are indicated by chain lines in FIG. 1.

The hooks 6 and bosses 7 are integral with and formed from the material of the connector flange 4 and may advantageously be produced in one cold-pressing operation. The relationship of the pressed-out hook and boss formation to the flange 4 is to be clearly seen in FIG. 4.

Advantageously, the connector 1 is provided with automatic connection-locking means comprising a spring-mounted and loaded pin 11 having a finger piece 11a. Simple, effective such means is shown in chain lines in FIGS. 4 and 5. The pin 11 is fixed in the lower part of a leaf spring 12 whose apertured upper portion 13 has a dependant central tongue with an inwardly and downwardly cranked lip 14 hooked over the lower edge 15 of a hole 16 left in the flange 4 by the pressing out of a hook 6. When the connector 1 is mounted on the upright 2, the pin 11 engages (FIG. 4) through a transversely elongated hole 17 in the connector flange 4 into the upper end of a hole 3 in the upright 2. It then serves to prevent accidental lifting of a boss 7 engaged in the latter hole and resultant disengagement of the hook 6 from that hole. In conjunction with the transversely elongated hole 17, the manner of mounting of the spring 12 by the lip 14 is such as to permit it to be swung to one side (to the left from the position shown in FIG. 5), after withdrawal of the pin 11 from the hole 3 in the upright 2, and rested on the face of the upright beside that hole. Beam handling, for instance on adjustment of position, by a single operator, is facilitated by the arrangement described. Automatic repositioning of the pin for engagement in a hole 3 may be provided for by a triangular tongue 18 on the spring 12 of which a flank encounters the inside of the adjacent inclined side wall 19 of the boss 7 as the connector is placed in position against the upright 2.

FIG. 6 shows, in outline, a connector 1 in position upon an upright 2 of suitable channel section. Two vertical series of the holes 3 (FIG. 5) are provided in the web 2a forming the front face of the upright. As shown, one connector only is attached to the upright by the left-hand line of holes 3 (masked by the flange 4 in FIG. 5). The right hand line of holes 3 is available for the attachment of a second connector with its beam extending in the opposite direction. The upright 2 is reduced in width in its rearward portion (FIG. 6) and may, if required, be provided with out-turned flanges 20.

I claim:

1. Connection means comprising a hook projecting from the plane of one structure member and shaped for engagement with an elongated hole having a portion of downwardly tapered shape in another structure member, wherein the hook is complemented by a boss which projects from the same plane and face of the said one member, but spaced from the hook in the vertical direction, and which is of downwardly tapering shape complementary to that of said hole for engaging by its sides with parts of the sides of the said downwardly tapering shape of the said hole with which the hook is engaged.

2. Connection means according to claim 1, wherein the boss is disposed closely above the hook from which it is separated by a transverse narrow web.

3. Connection means according to claim 1, wherein the hook and boss are integral with the said one member.

4. Connection means comprising a hook projecting from one structure member and shaped for engagement with an elongated hole having a portion of downwardly tapered shape in another structure member, wherein the hook is complemented by a boss which projects from the same face of the said one member, but spaced from the hook in the vertical direction, and which is engageable in a said hole in the said other member, said boss being of truncated pyramidal form with a base of substantially trapezium shape.

5. Connection means comprising a hook projecting from one structure member and shaped for engagement with an elongated hole having a portion of downwardly tapered shape in another structure member, wherein the hook is complemented by a boss which projects from the same face of the said one member, but spaced from the hook in the vertical direction, said boss having undercut sides and being engageable in a said hole in the said other member.

6. Connection means comprising a hook projecting from one structure member and shaped for engagement with an elongated hole having a portion of downwardly tapered shape in another structure member, wherein the hook is complemented by a boss which projects from the same face of the said one member, but spaced from the hook in the vertical direction, and which is engageable in a hole in the said other member, and a spring-loaded locking device arranged for engagement through a transverse slot above a boss into the upper part of a said hole.

* * * * *